UNITED STATES PATENT OFFICE.

PAUL JULIUS AND WALTHER REESS, OF LUDWIGSHAFEN, GERMANY, ASSIGNORS TO THE BADISCHE ANILIN AND SODA FABRIK, OF SAME PLACE.

PROCESS OF MAKING YELLOW BASIC DYES.

SPECIFICATION forming part of Letters Patent No. 644,324, dated February 27, 1900.

Application filed September 1, 1899. Serial No. 729,186. (No specimens.)

*To all whom it may concern:*

Be it known that we, PAUL JULIUS, doctor of philosophy, a subject of the Emperor of Austria-Hungary, and WALTHER REESS, doctor of philosophy, a subject of the King of Bavaria, residing at Ludwigshafen-on-the-Rhine, in the Kingdom of Bavaria and Empire of Germany, have invented new and useful Improvements in Processes of Manufacturing Yellow Basic Coloring-Matter, of which the following is a specification.

Our invention relates to an improvement in the art of manufacturing yellow basic coloring-matter.

In United States Letters Patent No. 637,183, of November 14, 1899, there has been described a process of making a new yellow basic coloring-matter by treating diamidotoluyl alcohol with beta-naphthylamin and beta-naphthylamin hydrochlorid. This diamido-toluyl alcohol was first obtained by Terrisse and Darier, as described in the above-named Letters Patent, from meta-toluylenediamin and one molecular proportion of formaldehyde by mixing these bodies together in aqueous solution at the ordinary temperature. Now we have found that the same product results if the diamido-toluyl alcohol above referred to be treated with beta-naphthol in the presence of an oxidizing agent, such as ferric chlorid.

The following example will show how our invention can best be carried out. The parts are by weight.

Example: Ninety-five (95) parts of diamido-toluyl alcohol and one hundred and thirty (130) parts of crystallized ferric chlorid are mixed and reduced to a fine powder. This powder is then introduced into one hundred and fifty (150) parts of molten beta-naphthol at a temperature of 140° centigrade and contained in an enameled vessel. Now raise the temperature to about 150° to 170° centigrade (one hundred and fifty to one hundred and seventy degrees centigrade) and maintain it so for about two (2) hours, stirring the mass in the meanwhile. The melt darkens and becomes viscous. Cool and powder the melt and extract the coloring-matter from it by means of about fifteen thousand (15,000) parts of boiling water. Filter from the resinous by-products, and precipitate the coloring-matter from the filtrate by means of common salt.

If it be desired to obtain the coloring-matter quite pure, dissolve the hydrochlorid as precipitated by common salt in water, precipitate the coloring-matter base from it by means of sodium carbonate, recrystallize the base from toluene, and convert the purified base into its hydrochlorid by means of hydrochloric acid.

Now we claim—

1. The improvement in the art of manufacturing basic yellow coloring-matter which consists in treating diamido-toluyl alcohol with beta-naphthol and an oxidizing agent, all substantially as described.

2. The improvement in the art of manufacturing basic yellow coloring-matter which consists in treating diamido-toluyl alcohol with beta-naphthol and ferric chlorid, all substantially as described.

In testimony whereof we have hereunto set our hands in the presence of two subscribing witnesses.

PAUL JULIUS.
WALTHER REESS.

Witnesses:
BERNHARD C. HESSE,
HOWARD E. J. INGLEY.